United States Patent
Chang

(10) Patent No.: US 9,476,703 B2
(45) Date of Patent: Oct. 25, 2016

(54) SIZE MEASURING AND COMPARING SYSTEM AND METHOD

(71) Applicant: HON HAI PRECISION INDUSTRY CO., LTD., New Taipei (TW)

(72) Inventor: Ting-She Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 777 days.

(21) Appl. No.: 13/901,579

(22) Filed: May 24, 2013

(65) Prior Publication Data

US 2014/0058702 A1 Feb. 27, 2014

(30) Foreign Application Priority Data

Aug. 27, 2012 (CN) .......................... 2012 1 03073700

(51) Int. Cl.
*G01B 21/04* (2006.01)
*G01B 11/02* (2006.01)

(52) U.S. Cl.
CPC .............. *G01B 21/04* (2013.01); *G01B 11/02* (2013.01)

(58) Field of Classification Search
CPC ... G01B 11/00; G01B 11/002; G01B 11/005; G01B 11/02; G01B 11/03; G01B 11/14; G01B 21/02–21/04; G01B 21/16; G01B 21/20

See application file for complete search history.

(56) References Cited

U.S. PATENT DOCUMENTS

2006/0012611 A1* 1/2006 Dujmich ............. G06F 17/5004
345/619
2012/0119091 A1* 5/2012 Hong .................... G01S 7/4802
250/349

OTHER PUBLICATIONS

Raymour & Flanigan Furniture, "Measuring for Delivery", no date, pp. 1-2.*
Lee, David C. et al., "Estimating Spatial Layout of Rooms using Volumnetric Reasoning about Objects and Surfaces", 2010, http://www.cs.cmu.edu/~dclee/pub/nips2010.pdf, pp. 1-9.*
Fidler, S. et al., "3D Object Detection and Viewpoint Estimation with a Deformable 3D Cuboid Model", no date, http://www.cs.toronto.edu/~fidler/papers/fidler_et_al_nips12.pdf, pp. 1-9.*

* cited by examiner

*Primary Examiner* — Mischita Henson
(74) *Attorney, Agent, or Firm* — Zhigang Ma

(57) ABSTRACT

The disclosure provides a size measuring and comparing system and a method. The method includes steps: acquiring coordinates of at least four points which are not assigned on a same side of an object, creating a cuboid model including the at least four points as vertices based on the coordinates of the at least four points, calculating a height and a width of a space, determining whether it is feasible for the object to pass through the space based on a length, a width, and a height of the cuboid model and the height and the width of the space; and outputting a comparison result.

6 Claims, 4 Drawing Sheets

SIZE MEASURING AND COMPARING SYSTEM AND METHOD

BACKGROUND

1. Technical Field

The disclosure relates to size measuring and comparing systems and, more particularly, to a size measuring and comparing system and a size measuring and comparing method adapted for an electronic device.

2. Description of Related Art

When it is needed to be determined whether an object is able to pass through a space, a user often measures the object and the space manually.

Therefore, what is needed is a size measuring and comparing system to overcome the described shortcoming.

DETAILED DESCRIPTION

Figure 1:
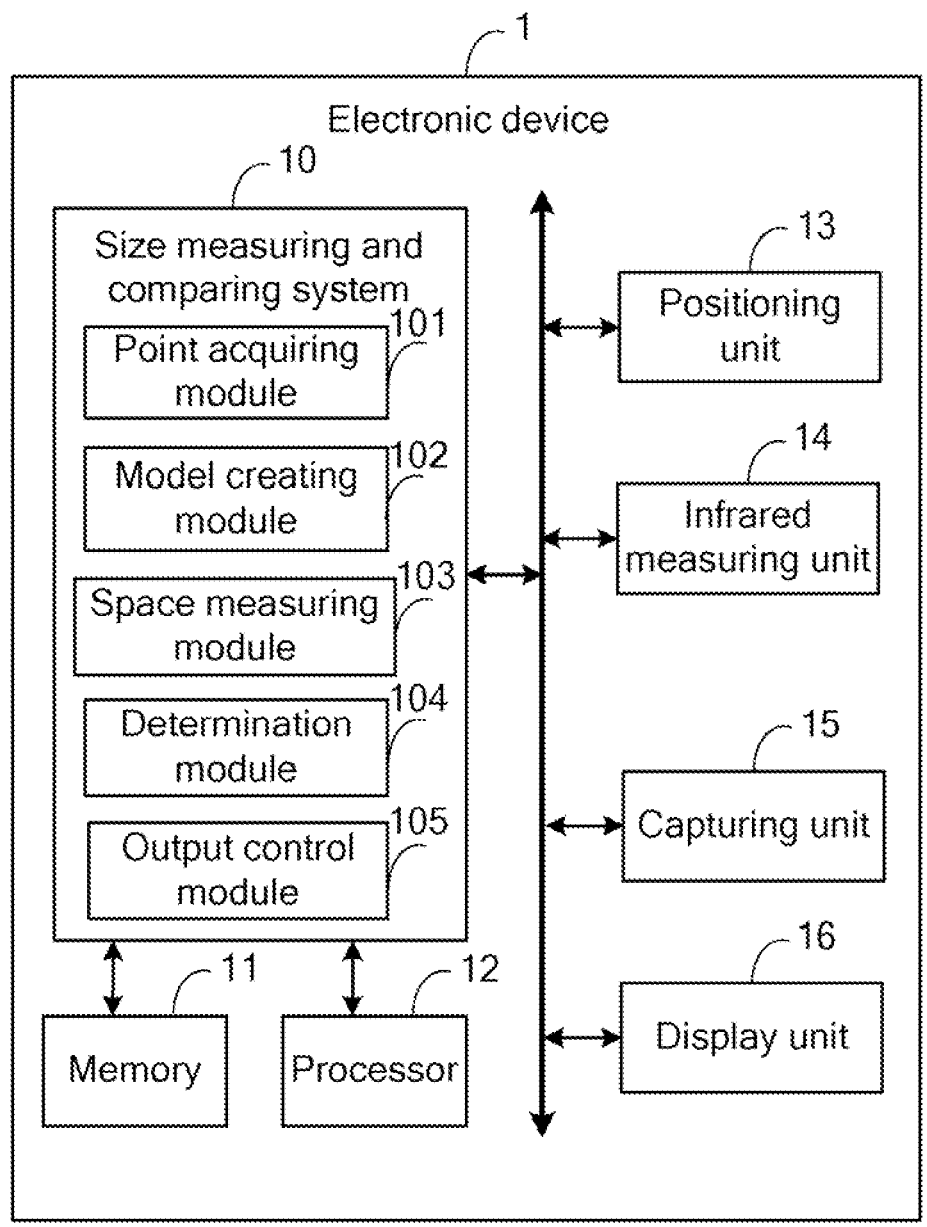
FIG. 1 is a block diagram of an electronic device including a size measuring and comparing system in accordance with an exemplary embodiment.

FIG. 1 is a block diagram of an electronic device 1 including a size measuring and comparing system 10 in accordance with an exemplary embodiment. The electronic device 1 includes the size measuring and comparing system 10, a memory 11, a processor 12, a positioning unit 13, an infrared measuring unit 14, a capturing unit 15, and a display unit 16. The size measuring and comparing system 10 further includes a point acquiring module 101, a model creating module 102, a space measuring module 103, a determination module 104, and an output control module 105. Software programs of all modules of the size measuring and comparing system 10 are stored in memory 11 and performed by the processor 12.

The positioning unit 13 positions an object and obtains a coordinate of each point of the object. The positioning unit 13 may be a GPS, or a G-sensor. In the embodiment, the object is a cuboid in shape including six sides. The point acquiring module 101 acquires coordinates of at least four points which are not assigned on a same side of the object. In the embodiment, the at least four points are vertices of the cuboid. For example, the point acquiring module 101 prompts a user to locate the electronic device 1 on the at least four points in sequence and obtains the coordinate of each of the at least four points from the positioning unit 13.

For a high precision, when the electronic device 1 is positioned on one point of the at least four points, the infrared measuring unit 14 calculates a distance between the object and the electronic device 1. When the distance between the object and the electronic device 1 is equal to zero or less than a preset value, such as 10 mm, the point acquiring module 101 activates the positioning unit 13 to measure the coordinates of the at least four points.

Figure 2:
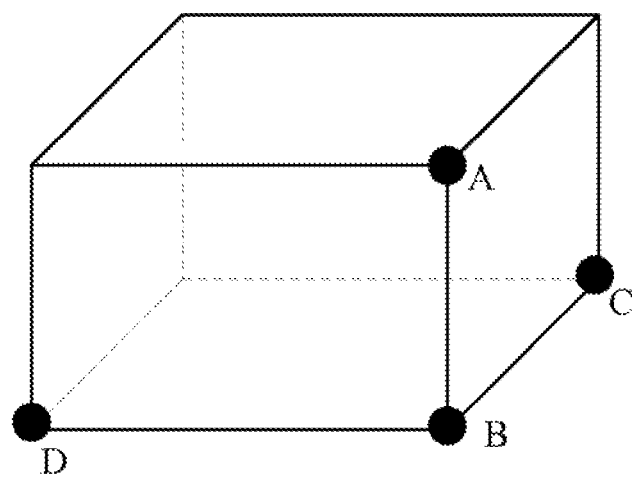
FIG. 2 is a schematic view of a cuboid model created by the size measuring and comparing system of FIG. 1.

The model creating module 102 creates a cuboid model including the at least four points as vertices based on the coordinates of the at least four points. The cuboid model is represented by a shape of the object. As shown in FIG. 2, the model creating module 102 creates a cuboid model including four points, for example, "A", "B", "C", and "D" points. The "A", "B", "C", and "D" points are not on a side of the cuboid model.

The space measuring module 103 calculates a height "H" and a width "W" of a space. The space is represented by an area which the object will pass through, for example, a door. In the embodiment, the space measuring module 103 controls the capturing unit 15 to capture a photo including a reference object and the space, measures a height and a width of the reference object and the space on the photo, and acquires a height "H0" and a width "W0" of the reference object to calculate the height "H" and the width "W" of the space.

Figure 3:
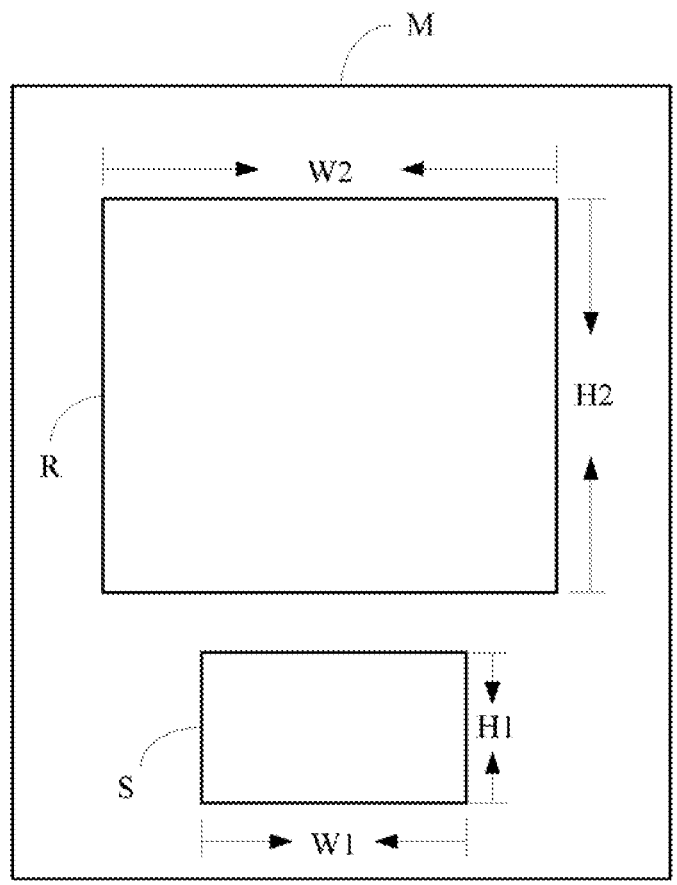
FIG. 3 is a schematic view of a photo captured by the electronic device of FIG. 1, including a reference object and a space.

As shown in FIG. 3, the capturing unit 15 captures the photo "M" including the reference object "S" and the space "R". The width of the reference object "S" on the photo "M" is W1, the height of the reference object "S" on the photo "M" is H1, the width of the space "R" on the photo "M" is W2, and the height of the space "R" on the photo "M" is H2. The space measuring module 103 calculates the width "W" of the space by a formula: W=W0*W2/W1, and the height "H" of the space by a formula: H=H0*H2/H1.

The determination module 104 determines whether it is feasible for the object to pass through the space based on a length, a width, and a height of the cuboid model and the height and the width of the space, and the output control module 105 outputs a result for the user based on the above determination. For example, when it is feasible for the object to pass through the space, the output control module 105 outputs a pass result; when the object can not pass through the space, the output control module 105 outputs a fail result.

For example, the determination module 104 acquires the short side and the shortest side from the length side, the width side, and the height side of the cuboid model, acquires the smallest face composed of the short side and the shortest side, and determines whether the smallest face of the cuboid model is feasible to pass through the space. If it is feasible for the smallest face to pass through the space, it is determined that the object can pass through the space. If the smallest face can not pass through the space, it is determined that the object can not pass through the space.

Figure 4:
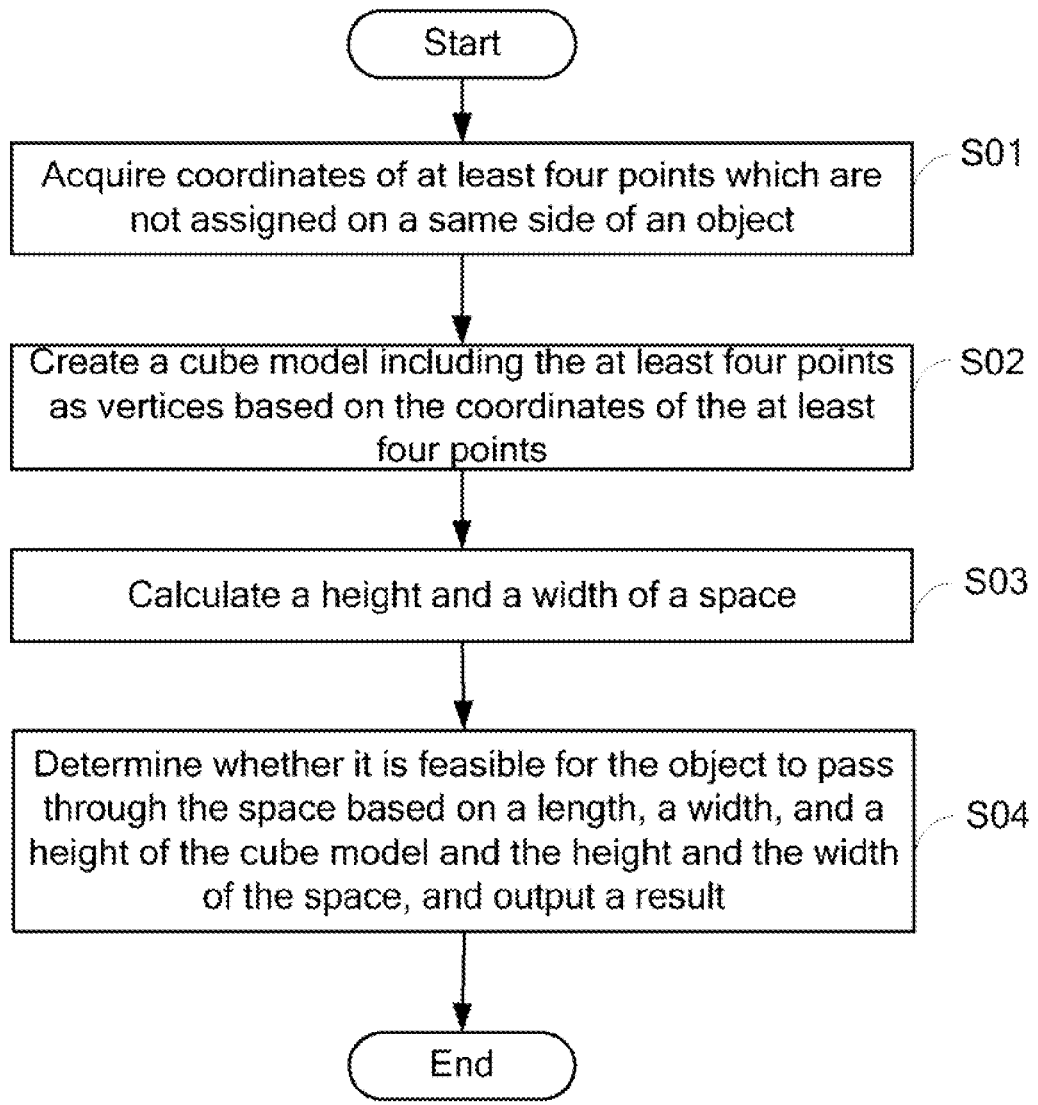
FIG. 4 is a flowchart illustrating a size measuring and comparing method in accordance with an exemplary embodiment.

FIG. 4 is a flowchart illustrating a size measuring and comparing method in accordance with an exemplary embodiment.

In step S01, the point acquiring module 101 acquires coordinates of at least four points which are not assigned on a same side of the object.

In step S02, the model creating module 102 creates a cuboid model including the at least four points as vertices based on the coordinates of the at least four points.

In step S03, the space measuring module 103 calculates a height and a width of a space.

In step S04, the determination module 104 determines whether it is feasible for the object to pass through the space based on the length, the width, and the height of the cuboid model and the height and the width of the space, and the output control module 105 outputs a result for the user.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising
a positioning unit for positioning an object which has a plurality of sides and obtaining a coordinate of each point of the object;
an infrared measuring unit, wherein when the electronic device is positioned on one point of the object, the infrared measuring unit calculates a distance between the object and the electronic device;
a capturing unit;
a processor; and
a storage device coupled to the processor and configured to store instructions for execution by the processor to cause the processor to:
acquire coordinates of at least four points which are not assigned on a same side of the object from the positioning unit when the infrared measuring unit determines that the distance between the object and the electronic device is equal to zero or is less than a preset value;
create a cuboid model including the at least four points as vertices based on the coordinates of the at least four points;
control the capturing unit to capture a photo including a reference object and a space, measure a height and a width of the reference object and the space on the photo, and acquire a height and a width of the reference object to calculate a height H of the space by a formula: H=H0*H2/H1, and a width of the space by a formula: W=W0*W2/W1, wherein the width of the reference object is W0, the height of the reference object is H0, the width of the reference object on the photo is W1, the height of the reference object on the photo is H1, the width of the space on the photo is W2, and the height of the space on the photo is H2;
determine whether it is feasible for the object to pass through the space based on a length, a width, and a height of the cuboid model and the height and the width of the space; and
output a result.

2. The electronic device as recited in claim 1, wherein the processor acquires the short side and the shortest side from the length side, the width side, and the height side of the cuboid model, acquires the smallest face composed of the short side and the shortest side, and determines whether it is feasible for the smallest face of the cuboid model to pass through the space; if the smallest face can pass through the space, the processor determines that the object can pass through the space and the processor outputs a pass result, and if the smallest face cannot pass through the space, the processor determines that the object cannot pass through the space and the processor outputs a fail result.

3. The electronic device as recited in claim 1, wherein the processor prompts a user to locate the electronic device on the at least four points in sequence and obtains the coordinate of each of the at least four points from the positioning unit.

4. A size measuring and comparing method adapted for an electronic device, the electronic device comprising a processor, a capturing unit, and an infrared measuring unit, the method comprising:
calculating, by the infrared measuring unit, a distance between an object and the electronic device when the electronic device is positioned on one point of the object;
acquiring, by the processor, coordinates of at least four points which are not assigned on a same side of an object when the distance between the object and the electronic device is equal to zero or is less than a preset value;
creating, by the processor, a cuboid model including the at least four points as vertices based on the coordinates of the at least four points;
capturing, by the capturing unit, a photo including a reference object and a space;
measuring a height and a width of the reference object and the space on the photo by the processor;
acquiring, by the processor, a height and a width of the reference object to calculate a height H of a space by a formula: H=H0*H2/H1, and a width W of the space by a formula: W=W0*W2/W1, wherein the width of the reference object is W0, the height of the reference object is H0, the width of the reference object on the photo is W1, the height of the reference object on the photo is H1, the width of the space on the photo is W2, and the height of the space on the photo is H2;
determining, by the processor, whether it is feasible for the object to pass through the space based on a length, a width, and a height of the cuboid model and the height and the width of the space; and
outputting, by the processor, a result.

5. The size measuring and comparing method as recited in claim 4, wherein the step "determining whether it is feasible for the object to pass through the space" comprises:
acquiring, by the processor, the short side and the shortest side from the length side, the width side, and the height side of the cuboid model;
acquiring, by the processor, the smallest face composed of the short side and the shortest side; and
determining, by the processor, whether it is feasible for the smallest face of the cuboid model to pass through the space.

6. The size measuring and comparing method as recited in claim 4, further comprising:
prompting, by the processor, a user to locate the electronic device on the at least four points in sequence and obtaining the coordinate of each of the at least four points.

* * * * *